(12) United States Patent
Sugizaki et al.

(10) Patent No.: US 7,979,644 B2
(45) Date of Patent: Jul. 12, 2011

(54) SYSTEM CONTROLLER AND CACHE CONTROL METHOD

(75) Inventors: Gou Sugizaki, Kawasaki (JP); Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 12/199,469

(22) Filed: Aug. 27, 2008

(65) Prior Publication Data

US 2008/0320237 A1 Dec. 25, 2008

Related U.S. Application Data

(63) Continuation of application No. PCT/JP2006/303789, filed on Feb. 28, 2006.

(51) Int. Cl.
*G06F 12/00* (2006.01)
(52) U.S. Cl. .................. 711/146; 711/156; 711/167
(58) Field of Classification Search .......... 711/146, 711/156, 167
See application file for complete search history.

(56) References Cited

U.S. PATENT DOCUMENTS

| 4,760,546 | A | 7/1988 | Ishida et al. | |
|---|---|---|---|---|
| 5,745,698 | A | 4/1998 | Allen et al. | |
| 5,905,998 | A * | 5/1999 | Ebrahim et al. | 711/144 |
| 6,272,604 | B1 * | 8/2001 | Nunez et al. | 711/146 |
| 6,678,800 | B1 | 1/2004 | Kurihara et al. | |
| 2006/0047918 | A1 | 3/2006 | Sugizaki | |
| 2006/0090041 | A1 | 4/2006 | Nakagawa | |
| 2006/0117149 | A1 | 6/2006 | Sugizaki | |

FOREIGN PATENT DOCUMENTS

| EP | 0165823 A2 | 12/1985 |
|---|---|---|
| JP | 61-7960 | 1/1986 |
| JP | 62-107351 | 5/1987 |
| JP | 4-181452 | 6/1992 |
| JP | 8-77126 | 3/1996 |
| JP | 2001-109662 | 4/2001 |
| JP | 2006-72509 | 3/2006 |
| JP | 2006-120029 | 5/2006 |
| JP | 2006-155110 | 6/2006 |

OTHER PUBLICATIONS

International Search Report mailed Sep. 12, 2006 in connection with International Application No. PCT/JP2006/303789.

* cited by examiner

*Primary Examiner* — Stephen C Elmore
(74) *Attorney, Agent, or Firm* — Staas & Halsey LLP

(57) ABSTRACT

A multiprocessor system comprises a plurality of system controllers, each of which performs a snoop processing regarding a cache device in its charge. The system controllers adjust the number of steps of a snoop pipeline for the snoop processing according to communication time with the other system controllers. The number-of-steps adjustment absorbs the difference of the communication time in the results of the snoop for each scale of the multiprocessor system. When a retrial is determined by an address conflict or the like in the snoop processing, each of the system controllers resubmits the access to be retried to the snoop pipeline after waiting until no other access which may cause an address conflict precedes. The resubmission timing prevents infinite repetition of the retrial of the snoop processing in the system controllers.

5 Claims, 12 Drawing Sheets

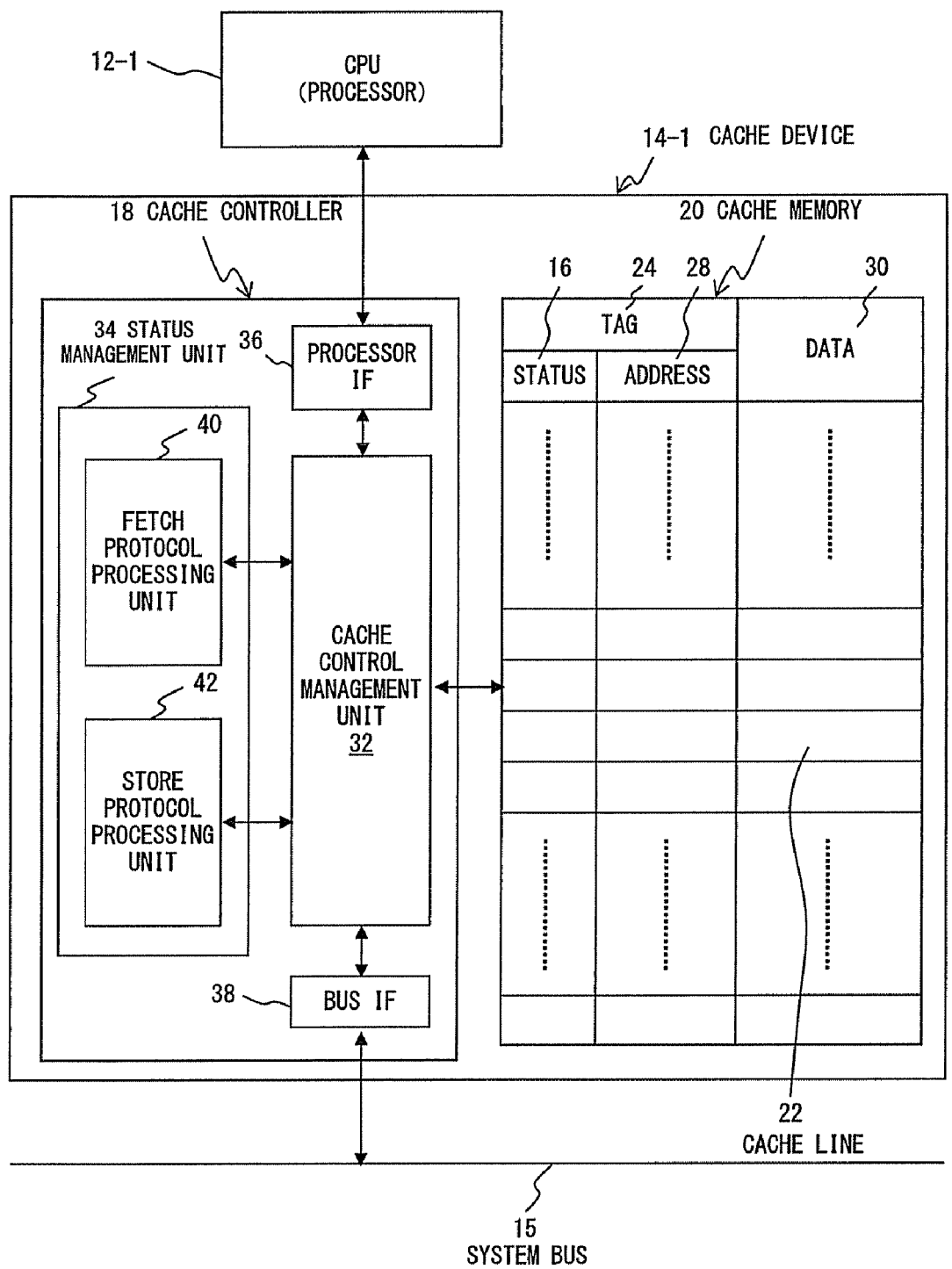
F I G. 7

SYSTEM CONTROLLER AND CACHE CONTROL METHOD

CROSS REFERENCE TO RELATED APPLICATIONS

This application is a continuation of PCT application of PCT/JP2006/303789 which was filed on Feb. 28, 2006.

BACKGROUND OF THE INVENTION

1. Field of the Invention

The present invention relates to a system controller for controlling a cache device constituting a multi-processor system, and to a cache control method for controlling the cache device. The present invention may be applied to a system controller and a cache control method that are capable of reducing occurrence of retry due to an address conflict between accesses while snooping processes are performed.

2. Description of the Related Art

With increasing need for higher processing speed for computer systems, each CPU in a conventional multi-processor system has been equipped with a cache device. The cache device provided for each CPU manages its data in individual blocks, in accordance with a rule called a cache coherence protocol for maintaining the coherence among cache memories, so as to keep the correctness of the data, i.e. to maintain the shared status and coherence of the data among the cache devices.

MESI cache protocol has been known as a conventional and common cache protocol. The protocol controls four statuses of M, E, S, I. M indicates "Modified" status where, in a plurality of cache devices, only one apparatus has valid data and the data is modified. Whether the value of the data corresponds to that of the main memory is not assured. E indicates the "Exclusive status" where, in the plurality of cache devices, only one apparatus has valid data. S indicates "Shared status" where the plurality of cache devices have the same data. I indicates "Invalid" status where the data in the cache devices are invalid.

When performing cache control using MESI cache protocol described above, a fetch request (where a CPU refers to a data block stored in a cache device in another CPU) requires a write process (hereinafter referred to as "MS write") of the data block into the main memory unit, resulting in a longer access time.

Therefore, a configuration utilizing five statuses (with another status "Shared Modified" O (indicating "Owner") being added to the four statuses of the MESI cache protocol) has been adopted to eliminate the need for the MS write with a fetch process.

However, even the protocol utilizing the five statuses requires, when a fetch process for a system is followed by a store process for the data from another system, a status change request to switch the status of another system from O: "Shared Modified" to I: "invalid." The store process requires longer time because of the status change request, which affects the access performance of the overall apparatus since such store process by a system on the data block acquired with a fetch request is often performed.

Given that, another technique has been disclosed: in a cache device comprising the cache memory and a cache controller, the cache memory stores 1) a part of data from the main memory in units of blocks in a cache line and 2) information indicating the status of the data blocks in the cache line, and the cache controller controls the cache memory by expressing the status of the data blocks using six statuses of, for example, I: "Invalid", S: "Shared", E: "Exclusive", M: "Modified", O: "SharedModified", as well as W: "Writable Modified" where data is to be shared in several stages, when a fetch request is issued.

The technique makes it possible to segentalize the status of the data blocks to be controlled in a cache device, so that occurrence of status change requests to other systems can be reduced, resulting in a higher access speed to the cache device.

FIG. 1 illustrates a snooping process in a relatively small multi-processor system (a lower model without an intervening crossbar switch) and FIG. 2 illustrates a snooping process in a relatively large multi-processor system (a higher model with an intervening crossbar switch).

As shown in FIG. 1 and FIG. 2, when a processor unit (CPU0) requests an access to a memory, the access request to the memory is broadcast to all the system controllers (SC0, SC1) that are relevant to the access, in order to maintain the coherence between cache devices. Each of the system controllers (SC0, SC1) then performs, simultaneously, a snooping process to detect a tag corresponding to the address in the cache device in the processor unit that the controller controls, and to check for conflicts on the target data and resource to be used for the data transfer. The result is communicated between the system controllers (SC0, SC1).

FIG. 3 illustrates a snooping process (with a retry) for a fetch request in a lower model.

The operation to be performed for the memory access process is determined finally, by an overall judgment from all of the obtained results. The result of the judgment must be the same for all the system controllers (SC0, SC1) and must be obtained simultaneously. When any conflict or shortage of resource is detected during the snooping process, the access processing is stopped to retry a snooping process.

However, the snooping control as described above had a problem that the communication time varies according to the distances between the plurality of system controllers, requiring performance of snooping processes that are adjusted in accordance with the size of the multi-processor system.

SUMMARY OF THE INVENTION

An object is to provide a system controller and a cache control method that are capable of adjusting, in a large information processing apparatus comprising multi processors, the number of stages in a snooping pipeline for snooping processes performed in a plurality of system controllers, so as to absorb differences between time required to communicate the snooping results, the differences generated depending on the size of the multi-processor system, and to determine, when there is a conflict between addresses for an access in a snooping process, a retry interval based on the number of stages in the snooping pipeline, preventing frequent occurrence of retry due to the address conflict.

According to an aspect of the embodiment, a system controller of the present invention is a controller for controlling a cache device constituting a multi-processor system, the cache device comprising a cache memory provided for each processor module and connected to each other, for storing a part of data from the maim memory in units of blocks in a cache line, and for storing information indicating the status of the data blocks stored in the cache line; and a cache controller for controlling the cache memory by expressing the status of the data block using six statuses of, for example, I: "Invalid", S: "Shared", E: "Exclusive", M: "Modified", O: "SharedModified", and W: "Writable Modified", the system controller comprising a snoop control unit in which the number of stages in a snooping pipeline is determined in accordance with the time required to communicate with another controller.

Preferably, the snoop control unit determines the retry interval in accordance with the number of stages.

In addition, the system controller is preferably an LSI for a large-system LSI comprising a plurality of the cache devices.

According to another aspect of the embodiment, a cache control method of the present invention is a cache control method for controlling a cache device constituting a multi-processor system, comprising storing, in a cache memory, a part of the data from the main memory in units of blocks in a cache line; storing information indicating the status of the data blocks stored in the cache line; controlling the cache memory by expressing the status of the data block using six statuses of, for example, I: "Invalid", S: "Shared", E: "Exclusive", M: "Modified", O: "Shared Modified", and W: "Writable Modified", in which, preferably, the number of stages in a snooping pipeline is determined in accordance with the time required to communicate with another controller.

Further preferably, the retry interval is determined in accordance with the number of stages.

The disclosed system makes it possible to absorb differences between amounts of time required to communicate snooping results, the differences generated depending on the size of the multi-processor system, and to prevent frequent occurrence of retry due to an address conflict.

BRIEF DESCRIPTION OF THE DRAWINGS

FIG. 7 is a block diagram showing functions of a cache device.

DESCRIPTION OF THE PREFERRED EMBODIMENTS

Figure 1:
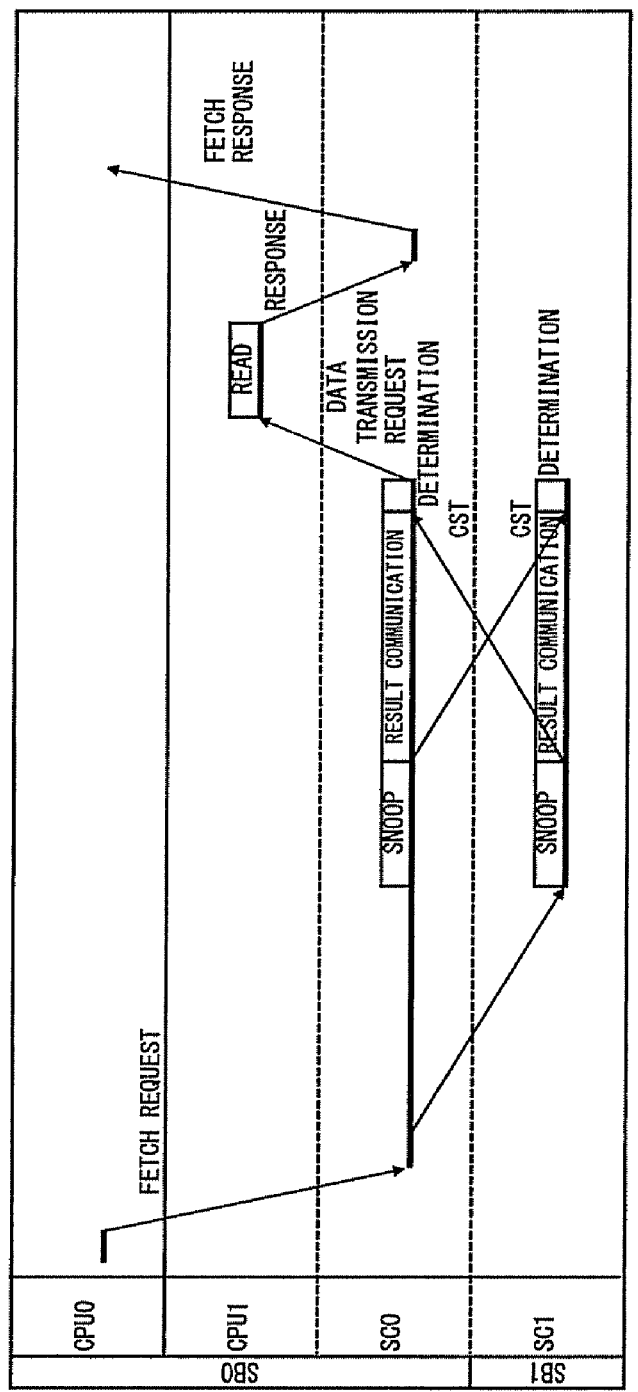
FIG. 1 illustrates snooping processes (without retry) for a fetch request in a lower model.
Figure 2:
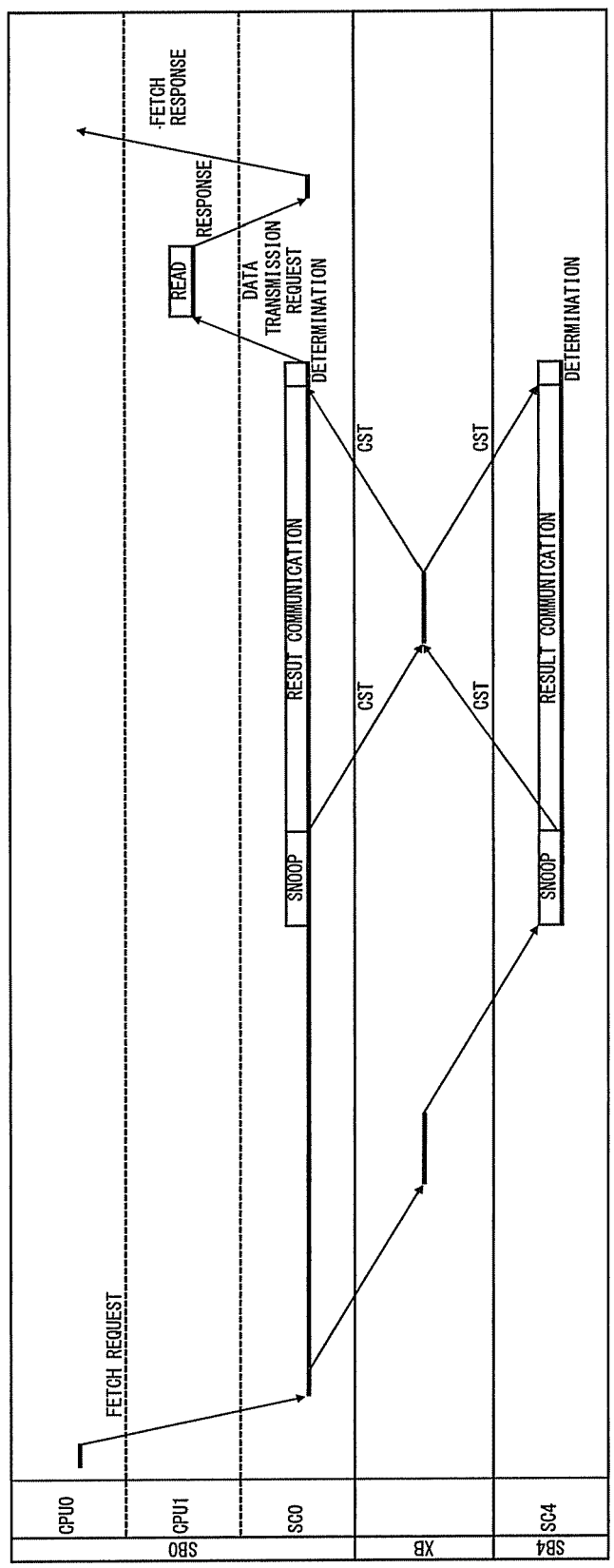
FIG. 2 illustrates snooping processes for a fetch request in a higher model.
Figure 3:
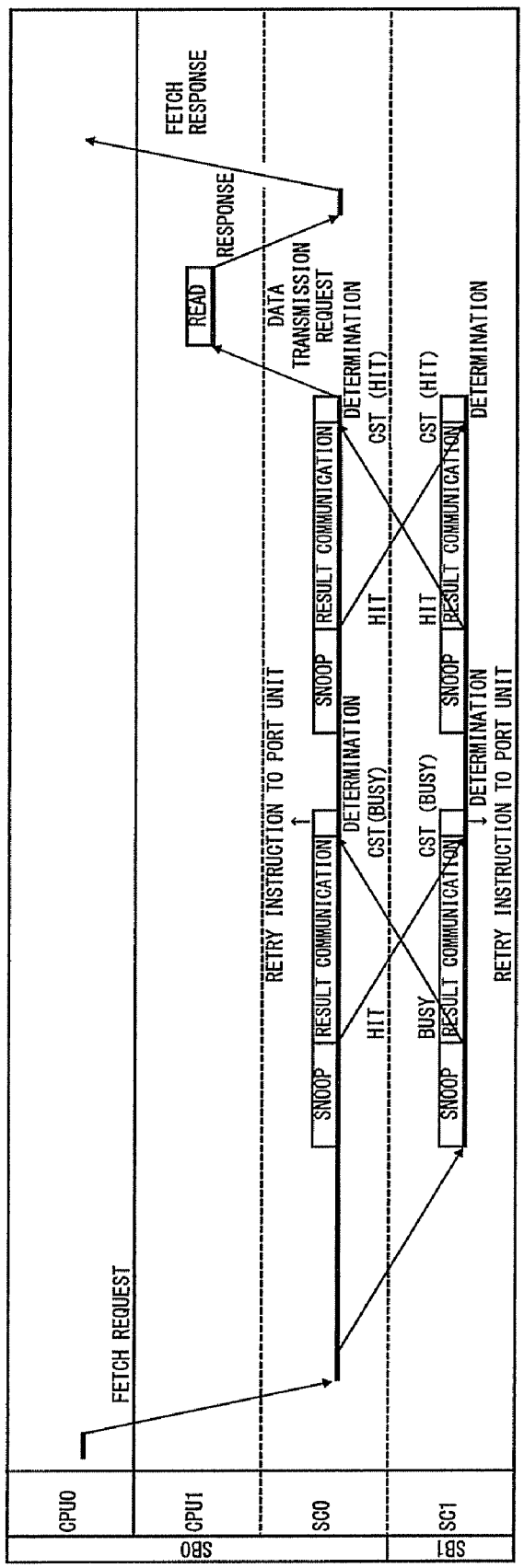
FIG. 3 illustrates snooping processes (with retry) for a fetch request in a lower model.

Hereinafter, embodiments are described, referring to the drawings.

Figure 4:
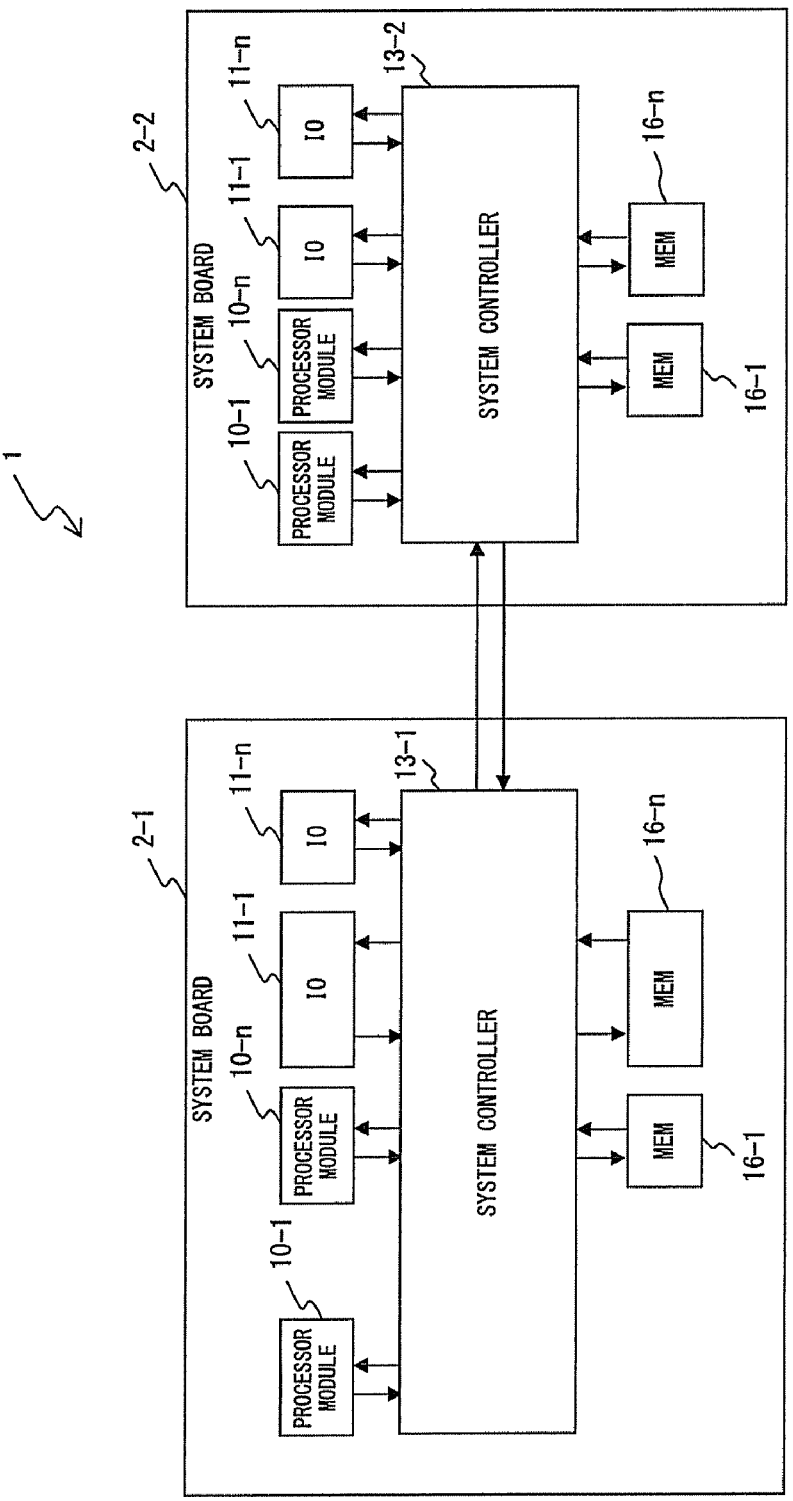
FIG. 4 illustrates an outline of a multi-processor system.

FIG. 4 illustrates an outline of a multi-processor system.

In FIG. 4, a multi-processor system 1 comprises a plurality of system boards (2-1, 2-2). Each system board 2-1, 2-2 comprises a system controller (13-1 or 13-2), a plurality of processor modules 10-1, . . . , 10-n, a plurality of Input/Output (I/O) devices 11-1, . . . , 11-n, and a plurality of memories (MEM) 16-1, . . . , 16-n. The system boards 2-1 and 2-2 are connected to each other so that they can communicate with each other, and control read/write to/from the memories 16-1, . . . , 16-n in accordance with instructions from the processor modules 10-1, . . . , 10-n or from the I/O devices 11-1, . . . , 11-n.

Figure 5:
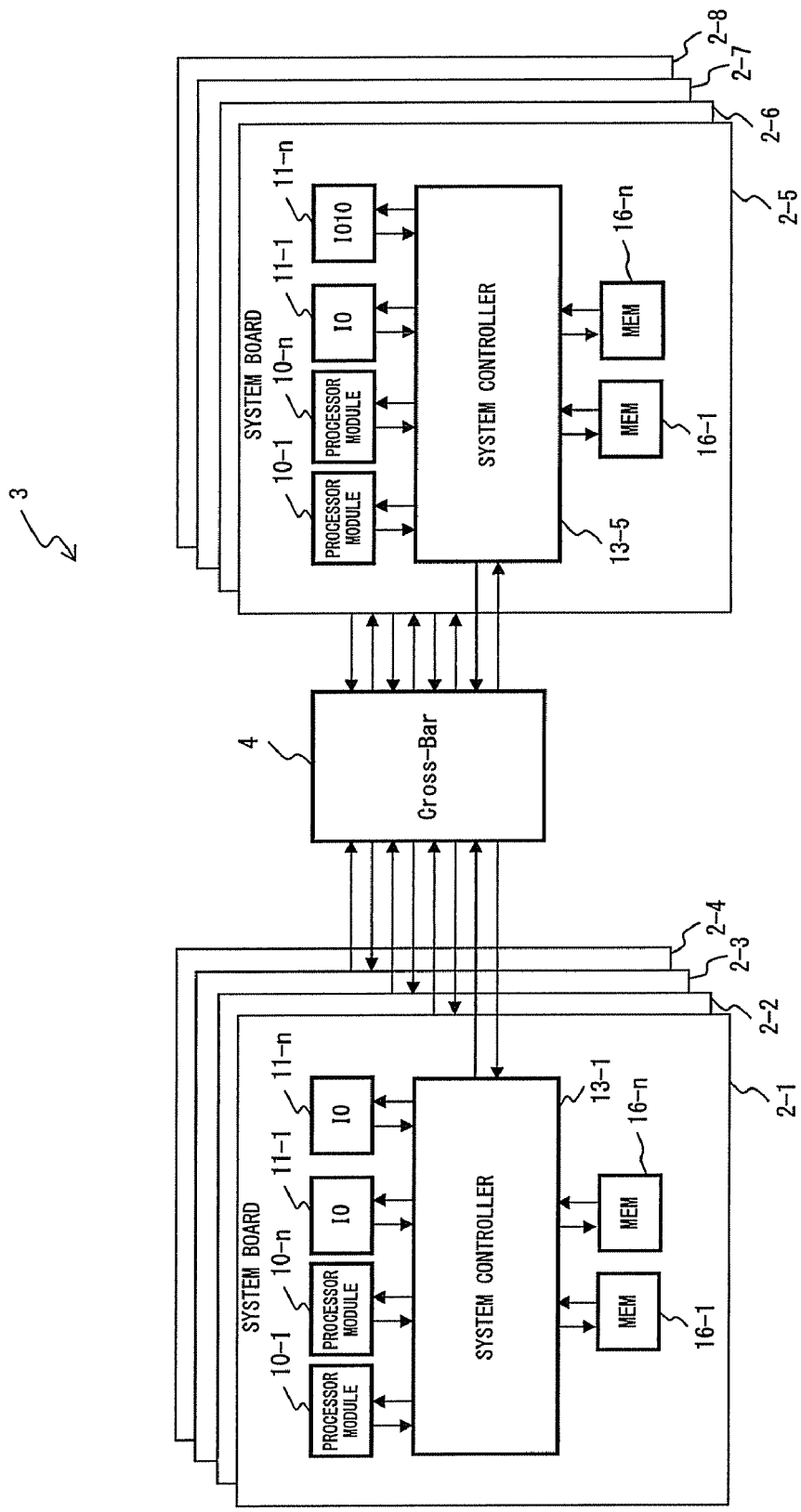
FIG. 5 illustrates an outline of a large-scale multi-processor system.

FIG. 5 illustrates an outline of a large-scale multi-processor system.

In FIG. 5, a multi-processor system 3 is larger in scale than the multi-processor system 1 in FIG. 4 described above, comprising more system boards: 2-1, 2-2, 2-3, 2-4, 2-5, 2-6, 2-7 and 2-8. The system boards 2-1, . . . , 2-8 are further connected to each other via a crossbar switch 4.

The system boards 2-1, . . . , 2-8 comprise, in the same manner as the system board 2-1 in the multi-processor system 1 in FIG. 4 described above, a system controller 13-1, . . . , 13-5, a plurality of processor modules 10-1, . . . , 10-n, a plurality of I/O devices 11-1, . . . , 11-n, and a plurality of memories (MEM) 16-1, . . . , 16-n.

The present invention can be applied to multi-processor systems such as the ones described in FIG. 4 and FIG. 5.

Figure 6:
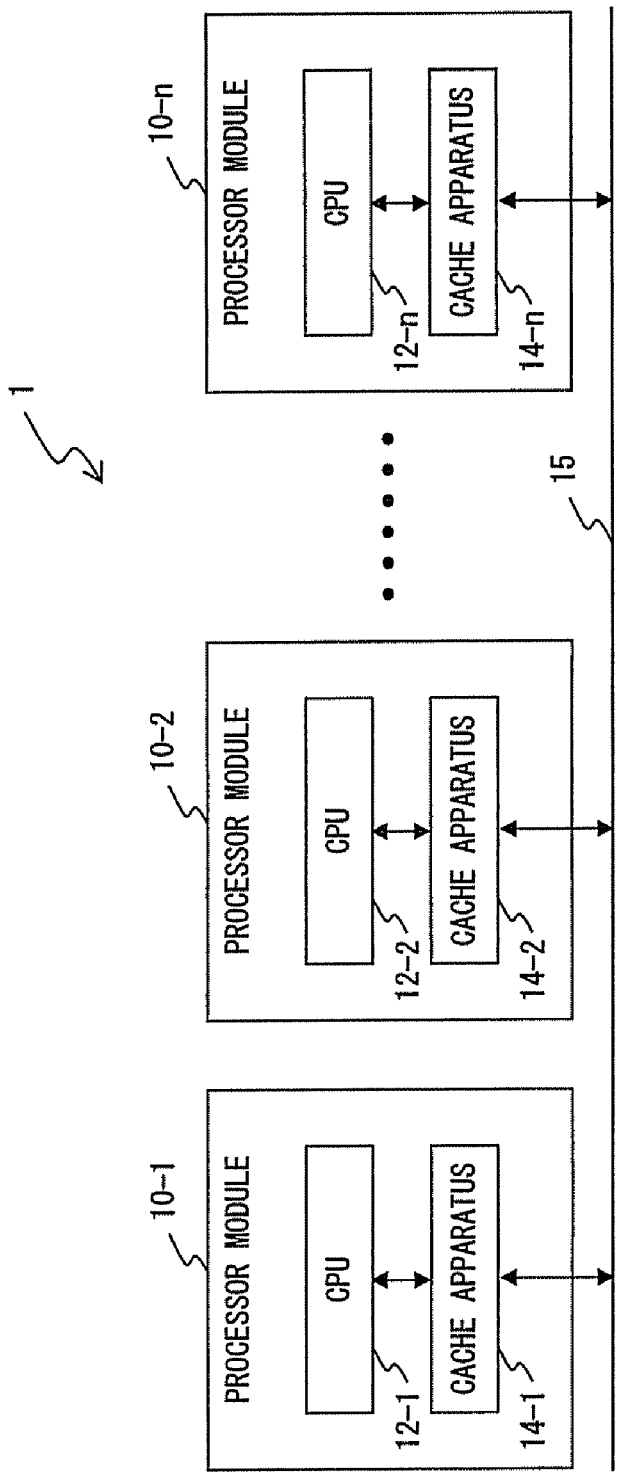
FIG. 6 is a block diagram showing a hardware configuration of a multi-processor system.

FIG. 6 is a block diagram showing a hardware configuration of a multi-processor system.

In FIG. 6, a multi-processor system 1 comprises a plurality of processor modules 10-1, 10-2, . . . , 10-n, and each of the processor modules 10-1 . . . 10-n comprises a CPU (processor) 12-1 . . . 12-n and a cache device 14-1 . . . 14-n. The cache devices 14-1 . . . , 14-n are connected to a system bus 15 so that the processor modules 10-1 . . . , 10-n are connected to each other.

An example of the system bus 15 to which the cache devices 14-1 . . . 14-n can be connected is a snoop bus. A snoop bus is a bus that is capable of, when any of the cache devices 14-1 . . . 14-n receives a fetch or store request from the CPU 12-1 . . . 12-n, obtaining the status of a data block stored in the cache line corresponding to the process request immediately, in accordance with a status signal from a snoop control line.

FIG. 7 is a block diagram showing functions of a cache device.

In FIG. 7, a cache device 14-1 comprises a cache controller 18 and a cache memory 20. The cache memory 20 stores data in units of a plurality of cache lines 22, each of the cache lines 22 including a tag 24 and data blocks 30. The tag 24 comprises a status tag 26 and an address tag 28.

The tag 26 of the cache memory 20 indicates the status of a data block using I: "Invalid" status, S: "Shared" status, E: "Exclusive" status, M: "Modified" status, O: "SharedModified" status, and W: "Writable Modified" status, to manage the cache memory 20.

The cache controller 18 comprises a cache control management unit 32, a status management unit 34, a processor interface (IF) 36, a bus interface (IF) 38. The status management unit 34 comprises a fetch protocol processing unit 40 and a store protocol processing unit 42.

When the cache control management unit 32 receives a fetch request from the CPU 12-1, it refers to the tag 24 in the cache memory 20 and search for a cache line 22 that has an address tag 28 whose address value corresponds to the requested address. When there is no cache line 22 corresponding to the address (indicating a cache miss), the required data block is obtained from the main memory or from one of the other cache devices 14-2 . . . 14-n and provided to the CPU 12-1.

When there is a cache line 22 having an address corresponding to the requested address, the cache control management unit 32 performs a process in accordance with the status (I: "Invalid" status, S: "Shared" status, E: "Exclusive" status, M: "Modified" status, O: "Shared Modified" status, and W: "Writable Modified" status) indicated by the status tag 26 of the cache line 22.

In response to a store request from the CPU 12-1, the cache control management unit 32 performs, with a cache hit, a store process to update the data block on the corresponding cache line 22 in the cache memory 20; with a cache miss-hit, a store process to secure a new cache line 22 and write data into the new cache line in the cache memory 20 is performed. When the corresponding address exists in one of the other cache devices 14-2 . . . 14-*n*, the store process is performed by writing-in the data after obtaining the latest data block from the one of the other cache device 14-2 . . . 14-*n*.

The status management unit 34 performs status shift control for the status tag 26 on the corresponding cache line 22 after the cache control management unit 32 performs the requested process as described above in response to the process request from any of the other cache devices 14-2 . . . 14-*n* sent via a the CPU 12-1 and the system bus 15.

The status shift control performed by the status management unit 34 to maintain cache coherence uses a cache protocol using six statuses (I: "Invalid" status, S: "Shared" status, E: "Exclusive" status, M: "Modified" status, O: "Shared Modified" status, and W: "Writable Modified" status).

The other cache devices 14-2 . . . 14-*n* have the same functions as the cache device 14-1 described above.

Figure 8:
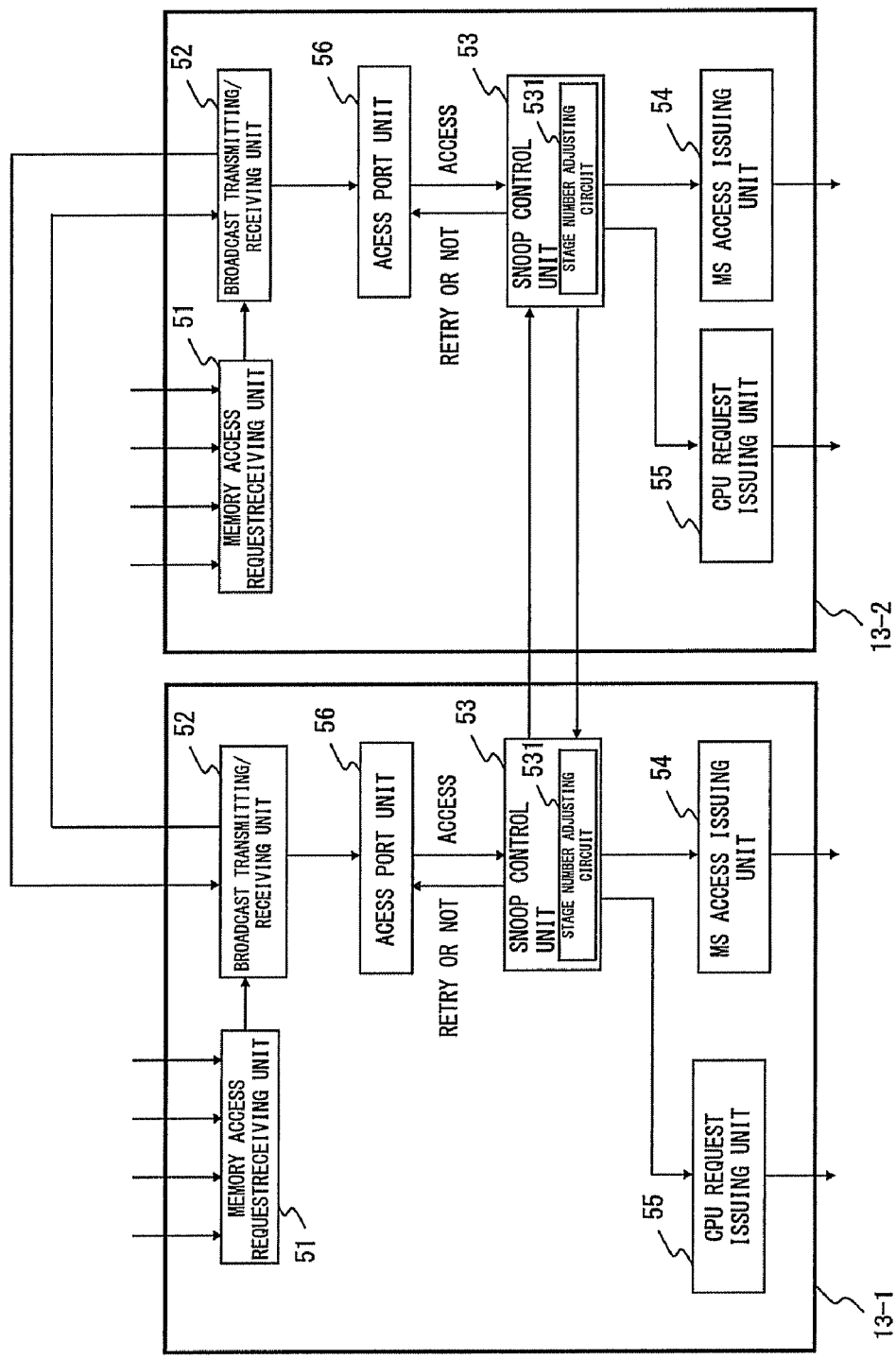
FIG. 8 is a block diagram showing functions of a system controller.
Figure 9:
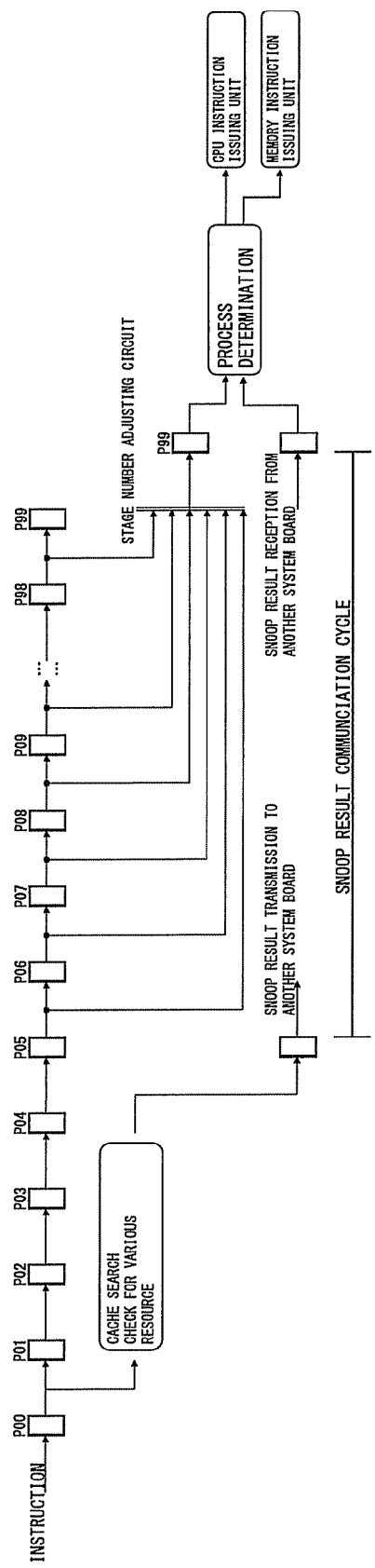
FIG. 9 is a block diagram of a pipeline.

FIG. 8 is a block diagram showing functions of a system controller. FIG. 9 is a block diagram of a pipeline.

In FIG. 8, each of system controllers 13-1, 13-2 comprises a memory access request receiving unit 51, a broadcast transmitting/receiving unit 52, an access port unit 56, snoop control unit 53, an MS access issuing unit 54 and a CPU request issuing unit 55.

The memory access request receiving unit 51 receives an access request to memories 16-1 . . . 16-2 from processor modules 10-1 . . . 10-*n* or I/O devices 11-1 . . . 11-*n*. When the access request received by the memory access request receiving unit 51 of the system controller 13-1 or 13-2 requests an access to the memories 16-1 . . . 16-2 in the other system controller (13-2 or 13-1), the broadcast transmitting/receiving unit 52 transmits/receives the access request to/from the broadcast transmitting/receiving unit 52 in the other system controller.

The snoop control unit 53 performs a snoop process for detecting contents stored in the memories 16-1 . . . 16-2, in accordance with the access request from the processor modules 10-1 . . . 10-*n* or from the I/O devices 11-1 . . . 11-*n* communicated via the broadcast transmitting/receiving unit 52. The snoop control unit 53 also comprises a stage number adjusting circuit 531 for adjusting the number of stages in a pipeline. Recent information processing apparatuses require operations in a large scale configuration, so the system controller 13-1, 13-2 especially needs to be capable of absorbing differences between environments according to various configurations (higher models and lower models). Since the time required to communicate the result (a CST packet) of snooping process varies depending on configuration, the stage number adjusting circuit 531 adjusts the number of the stages in a snooping pipeline in accordance with the time required to communicate the CST packet.

The MS access issuing unit 54 issues an access instruction for the access to the memories 16-1, . . . 16-2 in accordance with the direction from the snoop control unit 53, and the CPU request issuing unit 55 issues an access instruction for the access to the processor modules 10-1 . . . 10-*n*, in accordance with the direction from the snoop control unit 53.

Described next is a cache control process performed in a multi-processor system configured as described above.

Conventionally, when a plurality of accesses occur to a single address in a pipeline, subsequent accesses could not be processed until the result of snooping for a preceding access to the address is determined. This is because the update of the registration status of the target data block in a cache memory with the preceding access, and lock control for exclusive control of various addresses are performed.

Therefore, during the snooping process by the snoop control unit 53, a check for address conflicts is performed, to check whether preceding accesses in the pipeline contain any access to the same address. When the check result indicates a conflict, the access processing is stopped, to retry a snooping process. The conditions for the conflict check are 1) (target scope) a preceding access in the pipeline; result of snooping for the access has not been determined yet, and 2) (conflict condition) an access to the same data block; any factor for a retry has not been determined yet.

Next, operations for a retry of a snooping process are described, using an example where three accesses (A, B and C) have addresses conflicting with each other.

Figure 10:
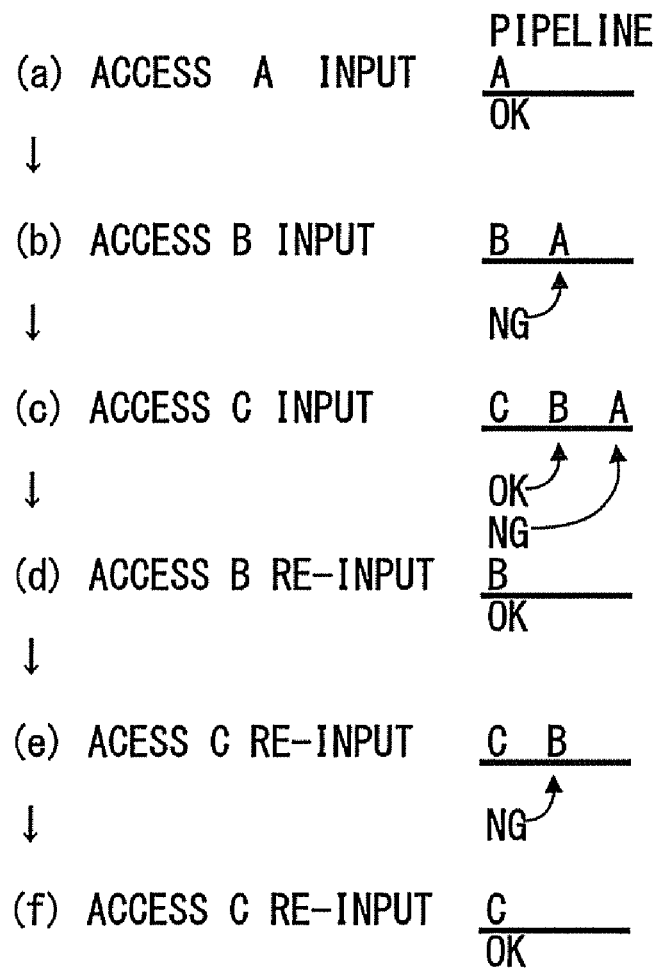
FIG. 10 illustrates address conflicts occurring when snooping processes are performed by one system controller.

FIG. 10 illustrates address conflicts occurring when snooping processes are performed by one system controller.

First, when an access A is input at (a), address conflict does not occur (OK) since there is no preceding access.

Next, when an access B is input at (b), address conflict occurs (NG) between the access B and the preceding access A, making the access B a target of retry.

Next, when an access C is input at (c), address conflict occurs (NG) between the access C and the preceding access A, making the access C a target of retry. Meanwhile, the access B is excluded from the check (OK) for the access C as the access B has already become a target of retry at (b) above.

Next, when the access B (set as a target of retry at (b) above) is input again (retry) at (d), address conflict does not occur (OK), since there is no preceding access at this time.

Next, when the access C (set as a target of retry at (c) above) is input again (retry) at (e), address conflict occurs (NG) between the access C and the preceding access B (input again at (d) above), making the access C a target of retry again.

When the access C is (set for the second time as a target of retry at (d) above) is input again (second retry) at (f), address conflict does not occur (OK), since there is no preceding access at this time.

Figure 11:
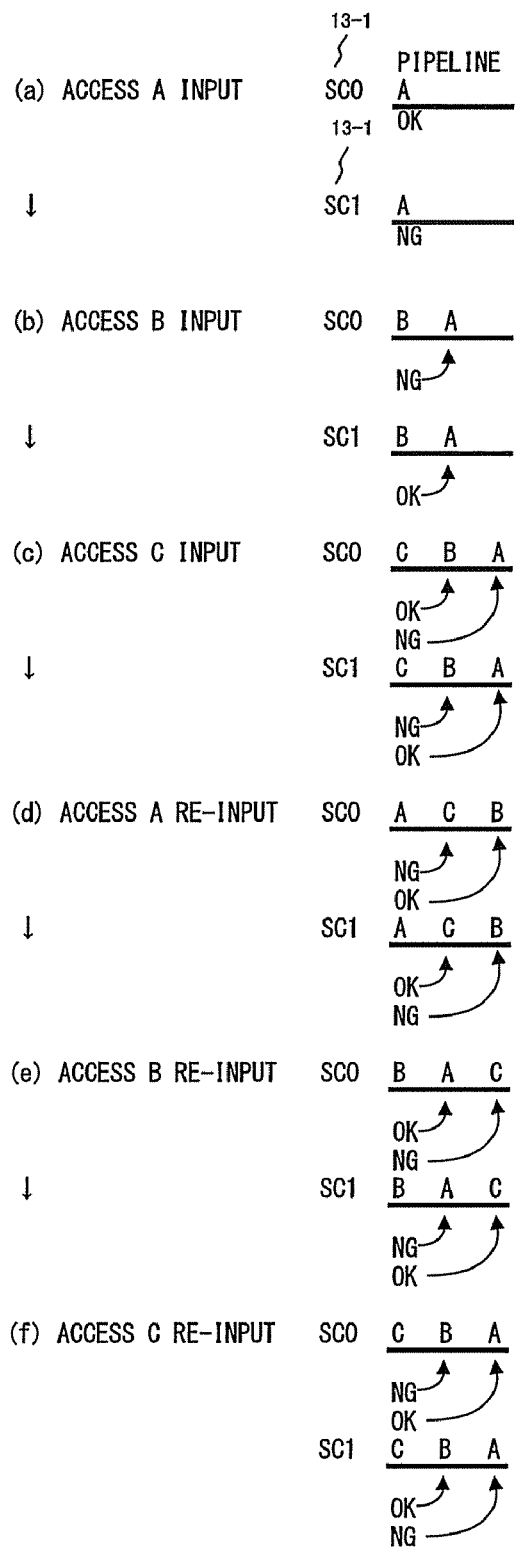
FIG. 11 illustrates address conflicts occurring when snooping processes are performed by a plurality of system controllers simultaneously.

FIG. 11 illustrates address conflicts occurring when snooping processes are performed by a plurality of system controllers simultaneously.

In order to make the explanation simple, address conflicts are illustrated in the case where system controllers 13-1 (SC0) and 13-2 (SC1) perform snooping processes simultaneously.

First, when an access A is input to the system controller 13-1 (SC0) at (a), address conflict does not occur (OK), since there is no preceding access. However, it is assumed here that when an access A is input to the system controller 13-2 (SC1), the access A is determined to be retried (NG), due to some other factors.

Then, when an access B is input to the system controller 13-1 (SC0) at (b), address conflict occurs (NG) between the access B and the preceding access A, making the access B a target of retry. However, when an access B is input to the system controller 13-2 (SC1), the access A is excluded from the check (OK) for the access B, as the access A has already become a target of retry at (a) above.

Next, when the access C is input to the system controller 13-1 (SC0) at (c), address conflict occurs (NG) between the access C and the preceding access A, making the access C a target of retry. Meanwhile, the access B is excluded from the check (OK) for the access C as the access B has already become a target of retry at (b) above. When an access C is input to the system controller 13-2 (SC1), the access A is excluded from the check (OK) for the access C as the access A has already become a target of retry at (a) above. However, address conflict occurs (NG) between the access C and the preceding access B, making the access C a target of retry.

Next, when the access A (set as a target of retry at (a) above) is input again to the system controller 13-1 (SC0) at (d), the access B is excluded from the check (OK) for the access A input again, as the access B has already become a target of retry at (b) above. However, address conflict occurs (NG) between the access A input again and the preceding access C, making the access A a target of retry again. When the access A is input again to the system controller 13-2 (SC1), address conflict occurs (NG) between the access A input again and the preceding access B, making the access A a target of retry again. Meanwhile, the access C is excluded from the check (OK) for the access A, as the access C has already become a target of retry at (c) above.

Next, when the access B (set as a target of retry at (b) above) is input again to the system controller 13-1 (SC0) at (e), address conflict occurs (NG) between the access B and the preceding access C, making the access B a target of retry again. Meanwhile, the access A is excluded from the check (OK) for the access B, as the access A has already become a target of retry at (d) above. When the access B is input again to the system controller 13-2 (SC1), the access C is excluded from the check (OK) for the access B, as the access C has already become a target of retry at (c) above. However, address conflict occurs (NG) between the access B and the preceding access A, making the access B a target of retry again.

Next, when the access C (set as a target of retry at (c) above) is input again to the system controller 13-1 (SC0) at (f), the access A is excluded from the check (OK) for the access C input again, as the access A has already become a target of retry at (d) above. However, address conflict occurs (NG) between the access C input again and the preceding access B, making the access C a target of retry again. When the access C is input again to the system controller 13-2 (SC1), address conflict occurs (NG) between the access C input again and the preceding access A, making the access C a target of retry again. Meanwhile, the access B is excluded from the check (OK) for the access C, as the access B has already become a target of retry at (e) above.

After this, there is a possibility that the process from (d) through (f) above is repeated endlessly.

Figure 12:
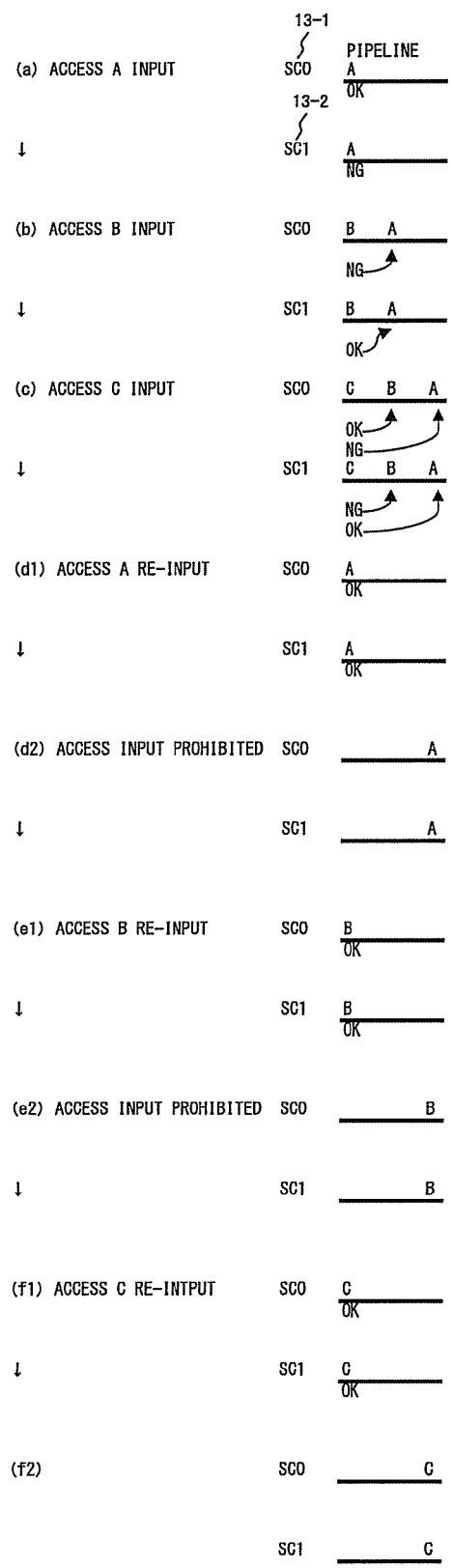
FIG. 12 illustrates a case where the access interval to a pipeline with a retry is controlled to be larger than the interval of stages in a snooping pipeline.

FIG. 12 illustrates a case where the access interval to a pipeline with a retry is controlled to be larger than the interval of stages in a snooping pipeline.

First, when an access A is input to the system controller 13-1 (SC0) at (a), address conflict does not occur (OK), since there is no preceding access. However, it is assumed here that when an access A is input to the system controller 13-2 (SC1), the access A is determined to be retried (NG), due to some other factors.

Then, when an access B is input to the system controller 13-1 (SC0) at (b), address conflict occurs (NG) between the access B and the preceding access A, making the access B a target of retry. However, when an access B is input to the system controller 13-2 (SC1), the access A is excluded from the check (OK) for the access B, as the access A has already become a target of retry at (a) above.

Next, when the access C is input to the system controller 13-1 (SC0) at (c), address conflict occurs (NG) between the access C and the preceding access A, making the access C a target of retry. Meanwhile, the access B is excluded from the check (OK) for the access C as the access B has already become a target of retry at (b) above. When an access C is input to the system controller 13-2 (SC1), the access A is excluded from the check (OK) for the access C as the access A has already become a target of retry at (a) above. However, address conflict occurs (NG) between the access C and the preceding access B, making the access C a target of retry.

When an address conflict occurs with a preceding access in the snooping pipeline as described above, a control is performed, not to make the access retried immediately, but to make the access input interval at the time of retry to be larger than the interval of stages in the snooping pipeline (to be in the condition where there is no preceding access having potential for conflict).

Then, when an access A is input again to the system controller 13-1 (SC0) at (d1), address conflict does not occur (OK), since there is no preceding access. When an access A is input again to the system controller 13-2 (SC1), address conflict does not occur (OK) either, since there is no preceding access.

Next, while an access input to the system controller 13-1 (SC0) is prohibited at (d2), the snooping process for the access A input again at (d1) above is completed. In the same manner, while an access input to the system controller 13-2 (SC1) is prohibited, the snooping process for the access A input again at (d1) above is completed.

Next, when an access B is input again to the system controller 13-1 (SC0) at (e1), address conflict does not occur (OK), since there is no preceding access. When an access B is input again to the system controller 13-2 (SC1), address conflict does not occur (OK) either, since there is no preceding access.

Next, while an access input to the system controller 13-1 (SC0) is prohibited at (e2), the snooping process for the access B input again at (e1) above is completed. In the same manner, while an access input to the system controller 13-2 (SC1) is prohibited, the snooping process for the access B input again at (e1) above is completed.

Next, when an access C is input again to the system controller 13-1 (SC0) at (f1), address conflict does not occur (OK), since there is no preceding access. When an access C is input again to the system controller 13-2 (SC1), address conflict does not occur (OK) either, since there is no preceding access.

Next, while an access input to the system controller 13-1 (SC0) is prohibited at (f2), the snooping process for the access C input again at (f1) above is completed. In the same manner, while an access input to the system controller 13-2 (SC1) is prohibited, the snooping process for the access C input again at (f1) above is completed.

Thus, for snooping processes performed in a plurality of system controllers, the number of stages in a snooping pipeline is adjusted, so as to absorb differences between amounts of times required to communicate the snooping results, the differences generated depending on the size of the multiprocessor system, and to determine, when there is a conflict between addresses for an access in a snooping process, a retry interval based on the number of stages in the snooping pipeline, preventing frequent occurrence of retry due to address conflicts.

Embodiments of the present invention have been described above referring to the drawings. The embodiments of the present invention described above can be realized as hardware, firmware on a DSP board or a CPU board, or software, as one of functions of a system controller.

A system controller according to the present invention is not limited to the embodiments described above as long as the functions are to be realized, and can be either a single apparatus, or a system or an integrated apparatus comprising a plurality of devices, or a system in which processes are performed through a network such as LAN and WAN.

In addition, the above can be realized by a system comprising a CPU, a memory such as ROM and RAM, an input device, an output device, an external recording device, a media driving device, and a network connecting device. That is, the above can be realized by providing a memory such as ROM and RAM storing program codes of software realizing the embodiments described above, an external recording device, or a portable recording medium to the a system controller, and reading out and performing the program codes by a computer of the system controller.

In this case, the portable recording medium and the like is a constituent of the present invention, as the program codes themselves read out from the portable recording medium and the like realize the novel functions of the present invention.

The portable recording medium for providing the program codes may include, for example, a flexible disk, hard disk, optical disc, magneto-optic disc, CD-ROM, CD-R, DVD-ROM, DVD-RAM, magnetic tape, nonvolatile memory card, ROM card, and various recording medium storing records through network connecting devices such as e-mail and PC communication (communication line, in other words).

The functions of the embodiments described can be realized, by performing program codes read out by a computer (information processing apparatus) on a memory. In addition, an OS and the like operating on a computer may perform a part or the whole of the actual processes in accordance with instructions in accordance with the program codes, the processes realizing the functions of the embodiments described above.

Furthermore, after program codes read out from a portable recording medium or a program (data) provided by a program (data) provider are written into a memory disposed on a function extension board inserted into a computer or a function extension unit connected to a computer, a CPU and the like of the function extension board or the function extension unit may perform a part or the whole of the actual processes in accordance with the program codes, the processes realizing the functions of the embodiments described above.

In other words, the present invention is not limited to the embodiments described above, and various configurations or forms maybe adopted for the present invention, without departing from the spirit and scope thereof.

What is claimed is:

1. A system controller for controlling a cache device constituting a multi-processor system,
    the cache device comprising:
        a cache memory provided in each processor module and connected to each other, for storing a part of data from a main memory in units of blocks in a cache line, and for storing information indicating a status of a data block stored in the cache line; and
        a cache controller for controlling the cache memory by expressing the status of the data block by using six statuses of I (Invalid), S (Shared), E (Exclusive), M (Modified), O (Shared Modified), and W (Writable Modified), and
    the system controller comprising:
        a snoop control unit in which a number of stages in a snooping pipeline is provided, the number being determined in accordance with a time required to communicate with another controller.

2. The system controller according to claim 1, wherein the snoop control unit determines a retry interval in accordance with the determined number of stages.

3. The system controller according to claim 1, wherein the system controller is an LSI for a large-system LSI comprising a plurality of the cache devices.

4. A cache control method for controlling a cache device constituting a multi-processor system, comprising:
    storing, in a cache memory, a part of data from a main memory in units of blocks in a cache line, and storing information indicating a status of a data block stored in the cache line; and
    controlling the cache memory by expressing the status of the data block by using six statuses of I (Invalid), S (Shared), E (Exclusive), M (Modified), O (Shared Modified), and W (Writable Modified),
    wherein a number of stages in a snooping pipeline is provided, the number being determined in accordance with a time required to communicate with another system controller.

5. The cache control method according to claim 4, further comprising determining a retry interval in accordance with the determined number of the stages.

* * * * *